United States Patent
Bolen et al.

(10) Patent No.: US 6,299,466 B1
(45) Date of Patent: Oct. 9, 2001

(54) CLOCKSPRING USING RESETTABLE FUSE FOR HEATED STEERING WHEEL

(75) Inventors: Patrick A. Bolen; Dennis D. Kaufman, both of Carthage; Brent E. Henderson, Ursa; Bruce E. Reid, Macomb, all of IL (US)

(73) Assignee: Methode Electronics, Inc., Chicago, IL (US)

( * ) Notice: Subject to any disclaimer, the term of this patent is extended or adjusted under 35 U.S.C. 154(b) by 0 days.

(21) Appl. No.: 09/474,516

(22) Filed: Dec. 29, 1999

(51) Int. Cl.[7] .............................. H01R 3/00; H01R 29/00; H01R 13/68
(52) U.S. Cl. ......................... 439/164; 439/174; 439/621
(58) Field of Search ............................... 439/174, 15, 621, 439/622, 164; 361/103, 104; 337/155; 219/204; 165/41

(56) References Cited

U.S. PATENT DOCUMENTS

| 4,640,340 | 2/1987 | Noda et al. ............................. 165/41 |
| 5,072,093 | 12/1991 | Scheuerer ............................. 219/204 |
| 5,460,535 | 10/1995 | Bolen .................................. 439/164 |
| 5,810,606 | 9/1998 | Ballast et al. ........................ 439/15 |
| 5,828,034 | * 10/1998 | Chang .................................. 209/209 |
| 5,902,153 | * 5/1999 | Weickenmeier et al. ............. 439/621 |
| 5,963,121 | 10/1999 | Stygar et al. ......................... 337/155 |
| 5,980,286 | 11/1999 | Best et al. ............................. 439/164 |
| 6,007,355 | * 12/1999 | Shibata et al. ....................... 439/164 |
| 6,078,092 | * 6/2000 | Wang .................................. 257/529 |

* cited by examiner

Primary Examiner—Tulsidas Patel
Assistant Examiner—Chandrika Prasad
(74) Attorney, Agent, or Firm—Steven M. Evans

(57) ABSTRACT

A clockspring for powering a heated steering wheel having a resettable fuse connected in series between the heating element and a power source for the heating element. When a predetermined current limit is exceeded the resettable fuse trips and breaks the circuit providing power to the heating element. After the resettable fuse cools, the resettable fuse automatically reestablished the connection between the heating element and the power source for the heating element. The resettable fuse can be easily and economically implemented into a conventional clockspring, thus enabling a conventional clockspring to provide electrical connections for high current devices, such as a steering wheel heating element. Moreover, the present invention provides a reliable and cost effective safety device for preventing damage to the clockspring and the vehicle, and serious injury to a driver or a passenger.

15 Claims, 4 Drawing Sheets

CLOCKSPRING USING RESETTABLE FUSE FOR HEATED STEERING WHEEL

FIELD OF THE INVENTION

The present invention relates generally to clocksprings for steering columns on automotive vehicles, and more particularly, to a clockspring having a resettable fuse.

BACKGROUND OF THE INVENTION

An increasing number of automobiles have air bag crash systems. The air bag is typically located on the steering wheel facing the driver. The air bag must be in continuous electrical connection with impact sensors in the car body. In the event of a crash, the impact sensor or sensors provide an electrical signal to the air bag crash assembly that instantly inflates the air bag. Accordingly, there is an essential need for a reliable electrical connection between the rotatable portion of the air bag assembly, which is mounted to the steering wheel, and the remaining portion of the assembly, which is mounted to the stationary steering column.

Electrical connections between rotatable and stationary parts are well-known. Typically, an electrical brush rests upon a conductive ring, with one of the parts being rotatable to provide a rotatable electrical connection. However, there is a risk, particularly during the impact of an accident, of transient failure of the electrical connection in the brush and ring system, which could result in failure of the entire air bag system crash assembly.

Accordingly, a clockspring has been previously developed. The clockspring typically includes a flat, flexible, ribbon cable wound around a rotatable hub. The rotatable hub is located on the steering column. The ribbon cable is contained within a housing. A first end of the ribbon cable is connected to a deployment unit of the air bag and a second end of the ribbon cable is connected to interconnectors which pass out of the housing. The interconnectors are connected to the impact sensor or sensors on a stationary location of the vehicle. In this manner, the deployment unit for the air bag is reliably connected to the impact sensors of the vehicle.

As discussed above, clocksprings were originally developed to provide a reliable connection between the steering wheel and the steering column for airbags. As clocksprings continue to develop, more and more accessory and instrument controls are being located upon the steering wheel and, as a result, are utilizing the clockspring for electrical connections to the steering column. These additional components are increasing the number of individual signal lines contained within the ribbon cable. Moreover, the electrical current requirements for individual signal lines are also increasing due to some of the high current devices being incorporated into the steering wheel.

Consumers continue to desire more and more comfort features with their automobiles. For example, one high current device or feature that may possibly be added to the steering wheel is a heating element. A conventional clockspring is not designed to handle such a high current device. Conventional practice would be to utilize a slip ring to transmit high electrical current between a steering wheel and a steering column. Unfortunately, slip rings have a tendency to generate unacceptable noise levels. Furthermore, slips rings wear over time causing degradation in performance.

Since clocksprings typically utilize thin ribbon cables with low amperage wiring, it can be potentially dangerous for high currents to flow through clocksprings. An uncontrolled high current in a clockspring could damage the vehicle and its instruments. Furthermore, resulting damage to the clockspring could likely defeat a major purpose of the clockspring: providing a reliable electrical connection for the airbag safety system. Moreover, such an uncontrolled current could cause a fire damaging the vehicle and seriously injuring a driver or passenger.

Accordingly, there is a need for a system of monitoring and controlling high current devices that utilize clocksprings.

OBJECTS AND SUMMARY OF THE INVENTION

An object of the present invention is to enable conventional clocksprings, with a slight modification, to safely handle high current devices.

Another object of the present invention is to monitor current flow though clocksprings of high current devices.

An additional object of the present invention is to enable a conventional clockspring to be modified at a minimal cost in order to handle high current devices.

A further object of the present invention is to enable a clockspring to recover automatically if a high current threshold through the clockspring is exceeded.

Moreover, a specific object of the present invention is to enable a clockspring to provide an electrical connection for a heating element in a heated steering wheel.

In accordance with the present invention, a clockspring for powering a heated steering wheel is provided having a resettable fuse connected in series between the heating element and a power source for the heating element. When a predetermined current limit is exceeded the resettable fuse trips and breaks the circuit providing power to the heating element. After the resettable fuse cools, the resettable fuse automatically reestablishes the connection between the heating element and the power source for the heating element. The resettable fuse can be easily and economically implemented into a conventional clockspring, thus enabling a conventional clockspring to provide electrical connections for high current devices, such as a steering wheel heating element. Moreover, the present invention provides a reliable and cost effective safety device for preventing damage to the clockspring and the vehicle, and serious injury to a driver or passenger.

DETAILED DESCRIPTION OF THE PREFERRED EMBODIMENTS

Figure 1:
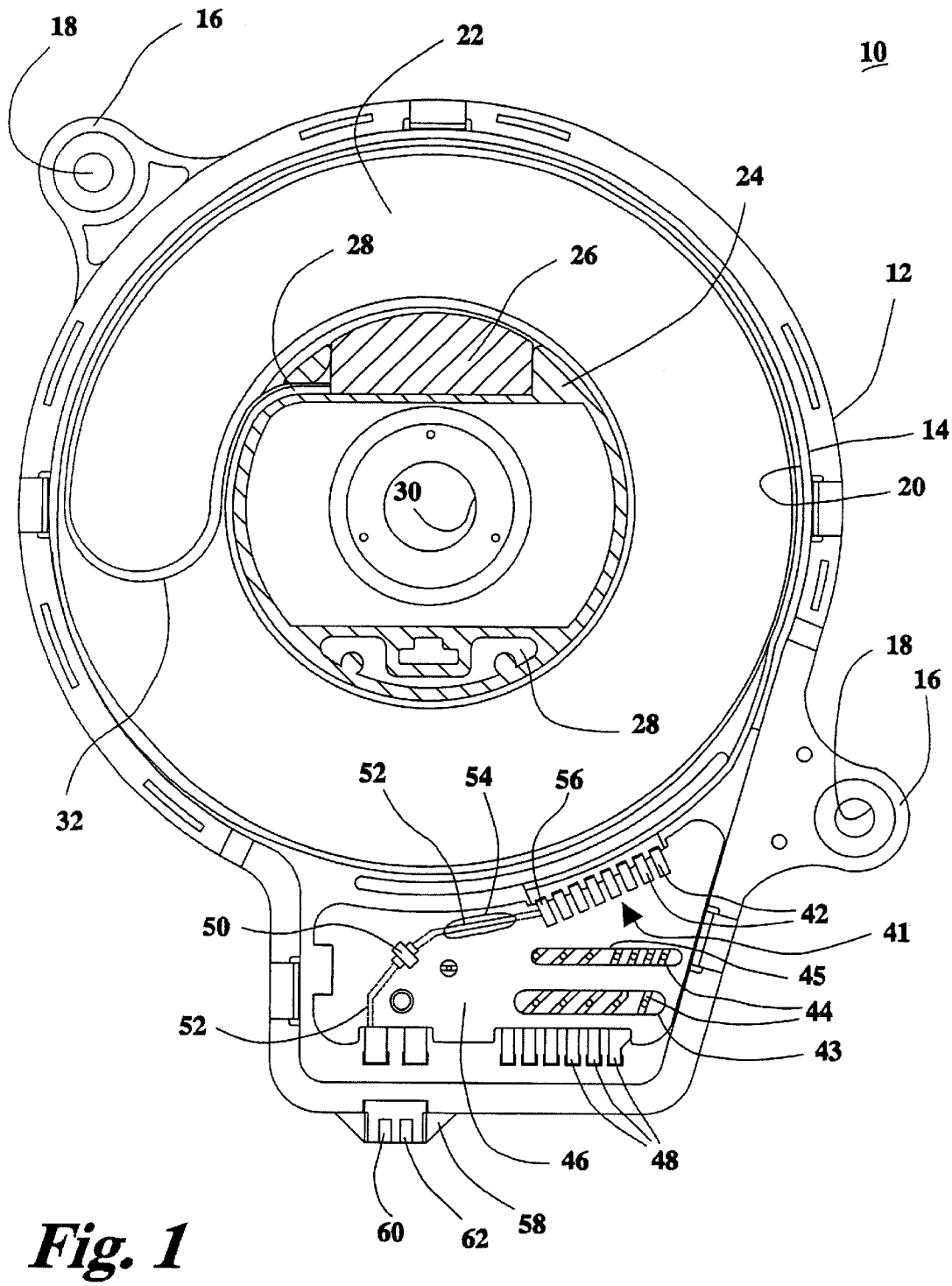
FIG. 1 is a cross-section of a clockspring configured in accordance with the present invention.

Referring now to the drawings, FIG. 1 shows a cross-sectional view of a clockspring 10 configured in accordance with the present invention. The clockspring 10 includes a frame 12 having a housing 14. The frame 12 includes mounting brackets 16 having mounting holes 18. The inside of the housing 14 is lined by a radial wall 20 and an inner back 22. A rotatable hub 24 is located in the center of the clockspring 10. The rotatable hub 24 includes a backbone 26 for securing a first end 28 of a ribbon cable 32. An aperture 30 is located at the center of the clockspring 10 to enable the clockspring 10 to be placed around a steering column of an automobile. The ribbon cable 32 is flexible and is wrapped around the hub 24 enough times so as to enable a steering column to be rotated as many times as necessary to turn the front wheels of a vehicle from a complete left turn to a complete right turn.

Figure 2:
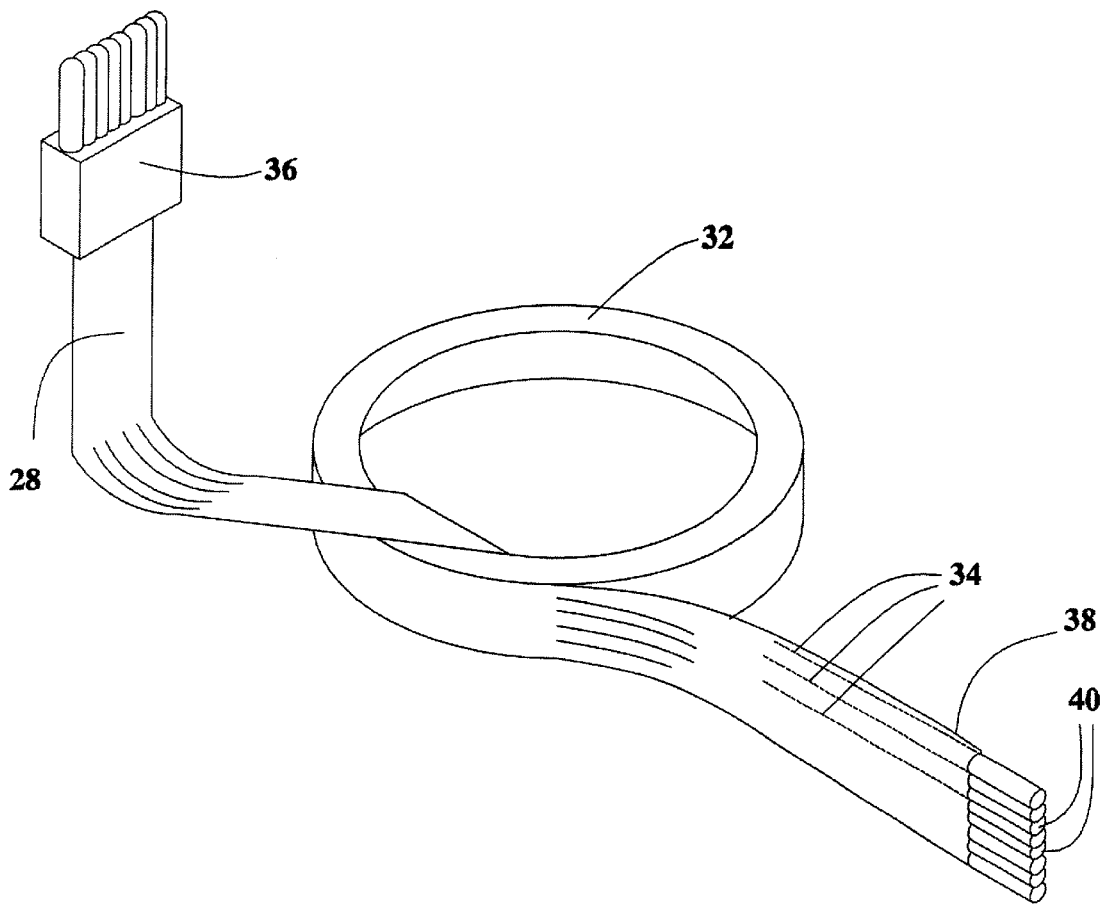
FIG. 2 illustrates a flexible ribbon cable configured in accordance with the present invention.

FIG. 2 illustrates the ribbon cable 32 separate from the clockspring 10. The ribbon cable 32 is relatively flat and contains numerous individual signal lines or channels 34, which are individual, insulated wires. In the illustrated embodiment there are eight signal lines 34. Of course, different embodiments of the present invention can comprise more or less signal lines 34 within the ribbon cable 32. The first end 28 of the ribbon cable 32 is attached to a connector plug 36 which is configured to plug into the backbone 26 of the hub 24. The plug 36 includes metal prongs 37. The second end 38 of the ribbon cable 32 has exposed signal line wires 40 which are to be connected to contacts 42 (FIG. 1).

Referring back to FIG. 1, the exposed signal line wires 40 of the ribbon cable 32 are connected to contacts 42. Contacts 42 are preferably copper leads that are electrically connected to connection lines or conductive traces 44 in a substrate 46 of the clockspring 10. The conductive traces 44 are preferably copper filaments etched into the substrate 44. The conductive traces 44 are visible through cut-aways 43 and 45 in the substrate 46. Contacts 48 are electrically connected to opposing ends of the conductive traces 44. The contacts 48 are preferably copper tabs or strips that may be inserted into a plug or other electrical receptacle.

Each conductive trace 44 corresponds to a specific channel 34 in the ribbon cable 32. The signal lines 34 may carry electrical signal for numerous devices on a steering wheel of an automobile. For example, these devices may include cruise control, turn signal control, windshield wiper control, horn control, and or course, deployment signals for an air bag crash system. Furthermore, the signal lines 34 may also communicate signals for high current devices such as a heating element for a steering wheel. A heating element for a steering wheel could draw current over 10 amperes. Left unrestricted or unmonitored, a high current could seriously damage the clockspring, the vehicle, and even injure the driver or passenger.

In accordance with the present invention, a resettable fuse is electrically connected in series on each of the signal lines of clockspring that may potentially draw an undesirably high current. If a predetermined current is exceeded, the resettable fuse temporarily terminates the electrical connection for that signal line to prevent damage. In accordance with a further feature of the present invention, the resettable fuse automatically reconnects a previously terminated connection after a period of time, thereby eliminating a need for any costly and burdensome manually maintenance to replace the fuse or reestablish a terminated connection.

FIG. 1 illustrates a resettable fuse 50 electrically connected to conductive trace 52 (shown in shadow and cutaway 54). Conductive trace 52 electrically connects specific connector lead 56 of connector 41 with specific contact lead 60 of connector plug 58. Plug 58 includes contacts 60 and 62 which may be connected to an electrical receptacle.

In the illustrated embodiment of FIG. 1, the signal line 34 connected to conductive trace 52 is designed to carry and monitor current for a high current device. In accordance with the invention, a conventional clockspring may be modified to handle a high current device at minimal costs by incorporating a resettable fuse into the necessary signal line of a clockspring. When the current on signal line 52 exceeds a predetermined limit, or temperature if desired, the resettable fuse 50 trips and breaks the electrical connection on conductive trace 52. After a period of time, or after the temperature of the resettable fuse 50 cools, the resettable fuse 50 automatically reestablishes the electrical connection of conductive trace 52.

Figure 3:
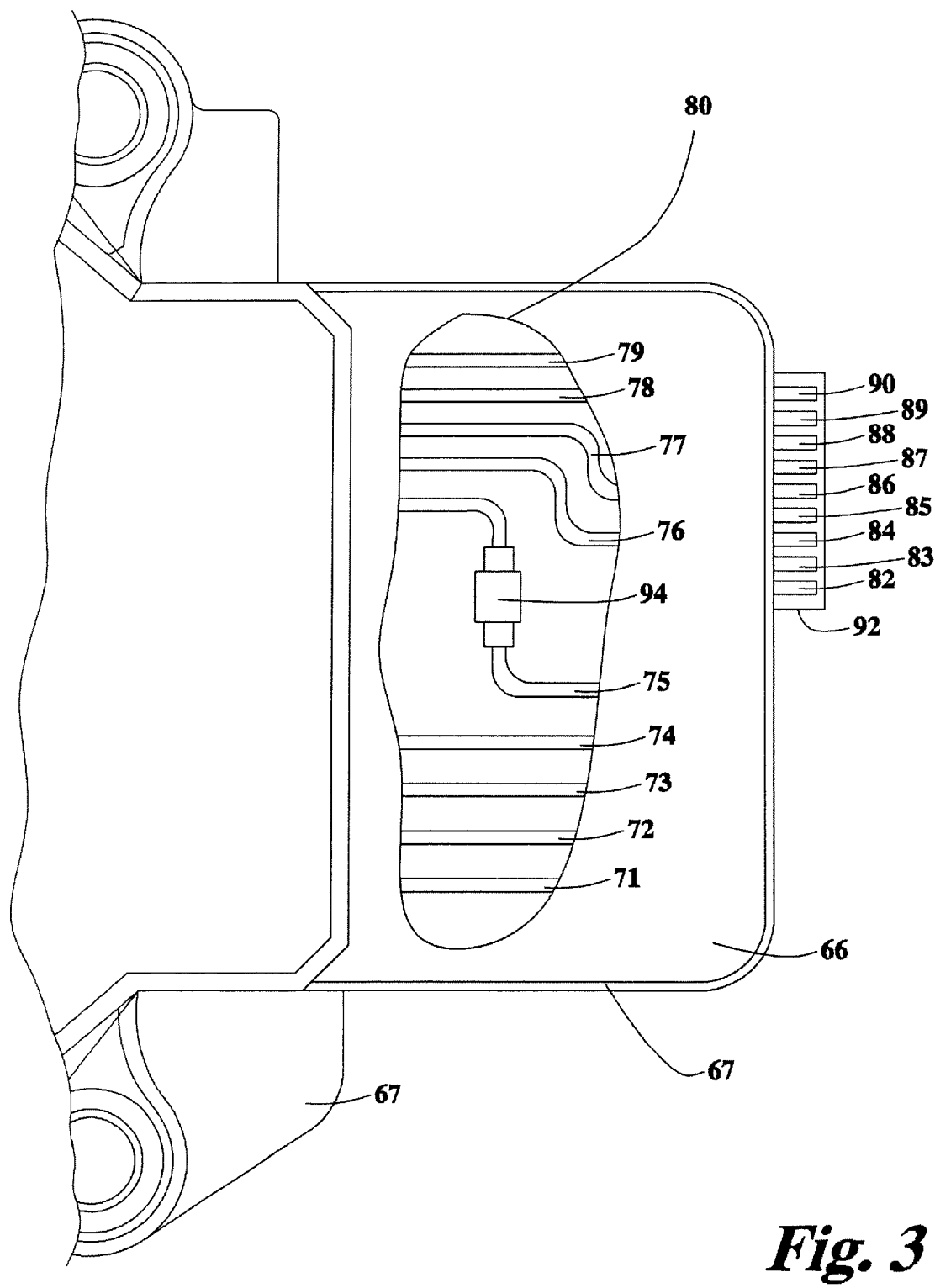
FIG. 3 is a cut-away view of the clockspring illustrating a resettable fuse incorporated into the substrate of the clockspring.

FIG. 3 illustrates another embodiment of the present invention. A substrate 66 is shown having nine conductive traces 71, 72, 73, 74, 5, 76, 78 and 79. The substrate 66 is secured to a rigid mounting board or base 67 of a clockspring. The mounting board 67 may be configured of plastic, metal, or other appropriate material. The conductive traces 71–79 are shown in a cut-away 80 of the substrate 66. The conductive traces 71–79 are electrically connected to contact leads 82–90, which are preferably composed of copper. The contact leads 82–90 are located on a plug 92 which is to be inserted into an appropriate socket or receptacle. A resettable fuse 94 is shown connected in series on conductive trace 75.

Figure 4:
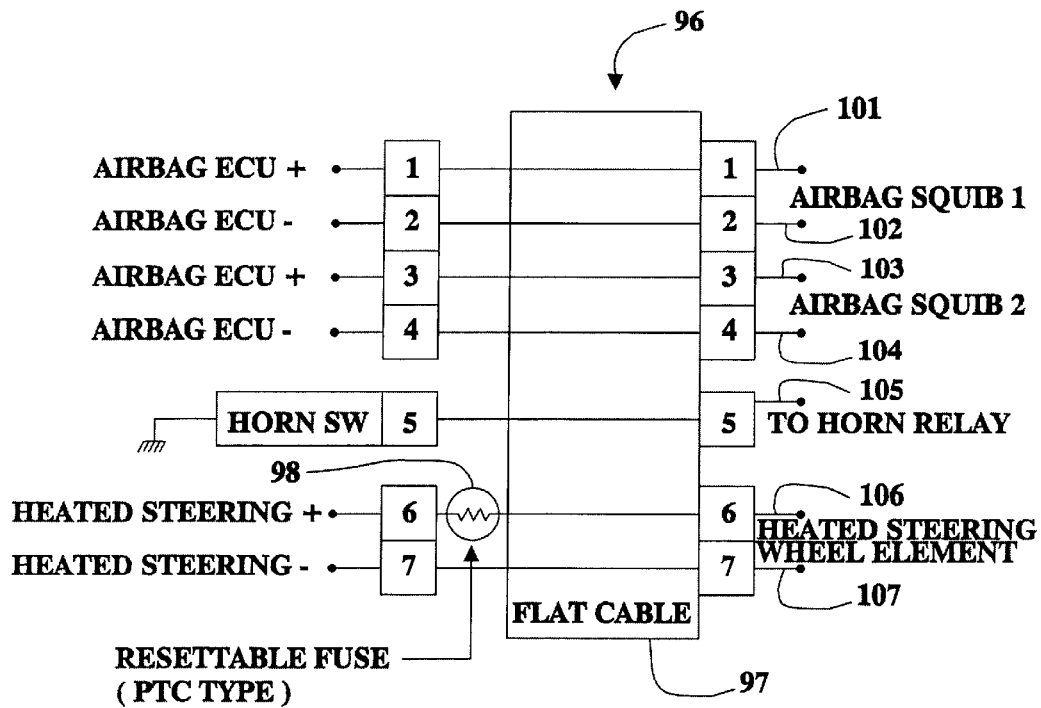
FIG. 4 is a circuit diagram of one embodiment of the present invention.

FIG. 4 illustrates a block circuit diagram 96 of a further embodiment of a clockspring according to the present invention. In this embodiment the clockspring has seven signal lines 101–107. A block diagram of a flat ribbon cable 97 is shown. Air bag signal lines 101–104 are illustrated, and signal line 105 corresponding to a vehicle horn is also illustrated. Illustrated signal lines 106 and 107 correspond to a heated steering wheel element. A resettable fuse 98 is shown connected in series on signal line 106.

Figure 5:
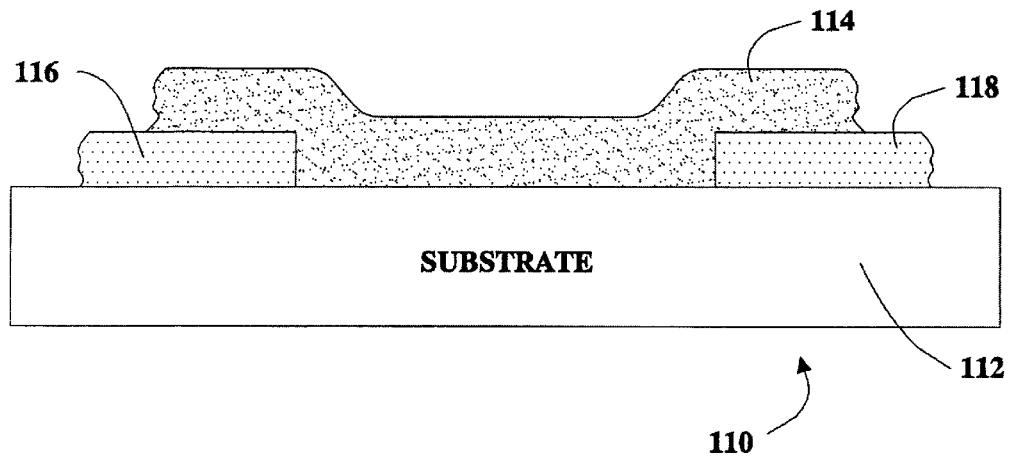
FIG. 5 is a cross-sectional view of a resettable fuse that may be utilized in the present invention.

FIG. 5 is a cross-sectional view of one embodiment of a resettable fuse 110 that may be utilized in the present invention. The resettable fuse 110 is formed into a substrate 112 and includes a fuse section 114 in contact with opposing electrical terminals 116 and 118. The fuse section 114 may be formed of a reaction material such as polyethylene glycol and a diepoxide. The terminals 114 and 116 may be formed from silver-filled epoxy resin. A detailed explanation of a resettable fuse that may be used in the present invention is provided in U.S. Pat. No. 5,963,121, issued to Stygar et al. on Oct. 5, 1999, which is hereby incorporated by reference.

It is to be understood that the foregoing description is merely a disclosure of particular embodiments and is no way intended to limit the scope of the invention. Other possible modifications will be apparent to those skilled in the art, all of which are intended to be covered by the following claims:

We claim as our invention:

1. A clockspring for a steering column of a vehicle, comprising:

a housing;

a rotatable hub mounted to the housing for winding a ribbon cable;

a substantially flat ribbon cable, wherein a first end of the substantially flat ribbon cable is connected to the hub and a second end of the substantially flat ribbon cable is connected to the housing;

a first signal line having a portion contained within the substantially flat ribbon cable; and a resettable fuse mounted to the housing and connected in series to the first signal line.

2. The clockspring of claim 1, the ribbon cable further comprising:

at least a second signal line.

3. The clockspring of claim 1, the housing further comprising:
   a first connector, proximate to the second end of the ribbon cable, for connecting the first signal line to the housing.

4. The clockspring of claim 3, the housing further comprising:
   a substrate for securing the first connector and the fuse to the housing, the substrate comprising at least one conductive trace and a second connector, wherein the at least one conductive trace provides an electrical connection between the first connector and the second connector.

5. The clockspring of claim 4, wherein the fuse is connected in series between the first and second connector via the at least one conductive trace.

6. The clockspring of claim 5, wherein the fuse is disposed on the substrate.

7. The clockspring of claim 6, wherein the fuse is resettable and a fuse section of the resettable fuse is comprised of a mixture of reaction product of polyethylene glycol and diepoxide.

8. The clockspring of claim 7, wherein the at least one conductive trace is composed essentially of copper disposed on the substrate.

9. The clockspring of claim 1, wherein the resettable fuse is connected in series between the hub and the first end of the ribbon cable.

10. The clockspring of claim 1, the ribbon cable further comprising multiple signal lines.

11. The clockspring of claim 1, wherein the first signal line carries electrical signals to a heating element in a steering wheel of a vehicle.

12. The clockspring of claim 1, further comprising:
    a plug having at least one prong electrically connected to the resettable fuse, the plug being connected proximate to an end of the ribbon cable, and the resettable fuse being located with the plug.

13. The clockspring of claim 1, wherein the resettable fuse is located in the hub.

14. A clockspring for a steering column of a vehicle, comprising:
    a housing;
    a hub rotatably attached to the housing;
    a ribbon cable having multiple signal lines providing electrical connections between the housing and hub, wherein at least one signal line is to be connected to a heating device in the steering wheel of a vehicle;
    a resettable fuse connected in series with the at least one signal line and positioned electrically between the heating device in the steering wheel and a power source for the heating device; and
    wherein tripping said resettable fuse terminates current flow in the at least one signal line, and after a period of time, said resettable fuse automatically resets, thus enabling current to flow in the at least one signal line.

15. A method of supplying high current to a heating element in a steering wheel of a vehicle via a clockspring ribbon cable, comprising the steps of:
    defining an acceptable current limit to be carried over a signal line of a clockspring ribbon cable between a power source on a column side of a steering wheel and a heating element in a steering wheel;
    passing current signals over the signal line and through a resettable fuse connected in series between the power source and the heating element;
    exceeding the acceptable current limit over the signal line;
    tripping the resettable fuse as a result of the acceptable current limit being exceeded, and thereby breaking an electrical connection provided by the signal line; and
    reestablishing automatically the electrical connection provided by the signal line after a period of time when the resettable fuse resets itself.

* * * * *